US011909924B1

(12) United States Patent
Mealancon

(10) Patent No.: US 11,909,924 B1
(45) Date of Patent: Feb. 20, 2024

(54) VEHICULAR COMMUNICATION SYSTEM

(71) Applicant: Leroy Mealancon, Palmdale, CA (US)

(72) Inventor: Leroy Mealancon, Palmdale, CA (US)

(*) Notice: Subject to any disclaimer, the term of this patent is extended or adjusted under 35 U.S.C. 154(b) by 260 days.

(21) Appl. No.: 17/409,849

(22) Filed: Aug. 24, 2021

(51) Int. Cl.
H04W 4/30 (2018.01)
H04M 9/00 (2006.01)
H04W 4/40 (2018.01)

(52) U.S. Cl.
CPC ............ H04M 9/001 (2013.01); H04W 4/40 (2018.02)

(58) Field of Classification Search
CPC .... H04B 1/086; H04B 1/3822; H04B 1/3827; H04B 1/3877; H04M 1/6041; H04M 1/6058; H04M 1/6066; H04M 1/6075; H04M 1/6083; H04M 1/6091; H04M 9/001; H04M 2250/02; H04W 4/40; H04W 4/80; H04W 12/47
See application file for complete search history.

(56) References Cited

U.S. PATENT DOCUMENTS

| 5,808,661 | A | 9/1998 | Infiesto | |
|---|---|---|---|---|
| 6,311,052 | B1 | 10/2001 | Lenz | |
| 6,574,341 | B1* | 6/2003 | Lee | H04M 1/6041 379/167.04 |
| 6,888,934 | B2 | 5/2005 | Bell | |
| 2001/0026623 | A1* | 10/2001 | Erwin | H04R 27/00 381/86 |
| 2004/0147273 | A1 | 7/2004 | Morphy | |
| 2004/0246607 | A1* | 12/2004 | Watson | B60R 1/12 359/872 |
| 2007/0037607 | A1* | 2/2007 | Matsuda | H04M 1/6091 455/569.2 |
| 2008/0273715 | A1* | 11/2008 | Snider | B60R 11/0217 381/86 |
| 2016/0065709 | A1* | 3/2016 | Lee | H04W 4/80 455/566 |
| 2018/0007480 | A1 | 1/2018 | Dieringer | |
| 2018/0013393 | A1 | 11/2018 | Dieringer | |
| 2022/0030368 | A1* | 1/2022 | Young | B60R 11/0217 |

FOREIGN PATENT DOCUMENTS

EP          1439669 A2 *   7/2004   ......... H04L 12/4135

* cited by examiner

Primary Examiner — Frank Duong
(74) Attorney, Agent, or Firm — Kyle A. Fletcher, Esq.

(57) ABSTRACT

The vehicular communication system is a communication device. The vehicular communication system incorporates a primary control circuit, an exterior control circuit, and a vehicle. The vehicle further comprises a cab and an exterior surface. The primary control circuit mounts within the cab of the vehicle. The external control circuit mounts on the exterior surface of the vehicle. The primary control circuit forms a first wireless communication link with a personal data device. The primary control circuit enables hands free operation of the personal data device within the cab of the vehicle. The primary control circuit forms a second wireless communication link with the external control circuit. The external control circuit enables hands free operation of the personal data device from the exterior of the vehicle.

13 Claims, 4 Drawing Sheets

VEHICULAR COMMUNICATION SYSTEM

CROSS REFERENCES TO RELATED APPLICATIONS

Not Applicable

STATEMENT REGARDING FEDERALLY SPONSORED RESEARCH

Not Applicable

REFERENCE TO APPENDIX

Not Applicable

BACKGROUND OF THE INVENTION

Field of the Invention

The present invention relates to the field of an unswitched communication arrangement providing a two-way communication system between a limited number of parties. (H04M9/001)

SUMMARY OF INVENTION

The vehicular communication system is a communication device. The vehicular communication system comprises a primary control circuit, an exterior control circuit, and a vehicle. The vehicle further comprises a cab and an exterior surface. The primary control circuit mounts within the cab of the vehicle. The external control circuit mounts on the exterior surface of the vehicle. The primary control circuit forms a first wireless communication link with a personal data device. The primary control circuit enables hands free operation of the personal data device within the cab of the vehicle. The primary control circuit forms a second wireless communication link with the external control circuit. The external control circuit enables hands free operation of the personal data device from the exterior of the vehicle.

These together with additional objects, features and advantages of the vehicular communication system will be readily apparent to those of ordinary skill in the art upon reading the following detailed description of the presently preferred, but nonetheless illustrative, embodiments when taken in conjunction with the accompanying drawings.

In this respect, before explaining the current embodiments of the vehicular communication system in detail, it is to be understood that the vehicular communication system is not limited in its applications to the details of construction and arrangements of the components set forth in the following description or illustration. Those skilled in the art will appreciate that the concept of this disclosure may be readily utilized as a basis for the design of other structures, methods, and systems for carrying out the several purposes of the vehicular communication system.

It is therefore important that the claims be regarded as including such equivalent construction insofar as they do not depart from the spirit and scope of the vehicular communication system. It is also to be understood that the phraseology and terminology employed herein are for purposes of description and should not be regarded as limiting.

BRIEF DESCRIPTION OF DRAWINGS

The accompanying drawings, which are included to provide a further understanding of the invention are incorporated in and constitute a part of this specification, illustrate an embodiment of the invention and together with the description serve to explain the principles of the invention. They are meant to be exemplary illustrations provided to enable persons skilled in the art to practice the disclosure and are not intended to limit the scope of the appended claims.

DETAILED DESCRIPTION OF THE EMBODIMENT

The following detailed description is merely exemplary in nature and is not intended to limit the described embodiments of the application and uses of the described embodiments. As used herein, the word "exemplary" or "illustrative" means "serving as an example, instance, or illustration." Any implementation described herein as "exemplary" or "illustrative" is not necessarily to be construed as preferred or advantageous over other implementations. All of the implementations described below are exemplary implementations provided to enable persons skilled in the art to practice the disclosure and are not intended to limit the scope of the appended claims. Furthermore, there is no intention to be bound by any expressed or implied theory presented in the preceding technical field, background, brief summary or the following detailed description.

Figure 1:
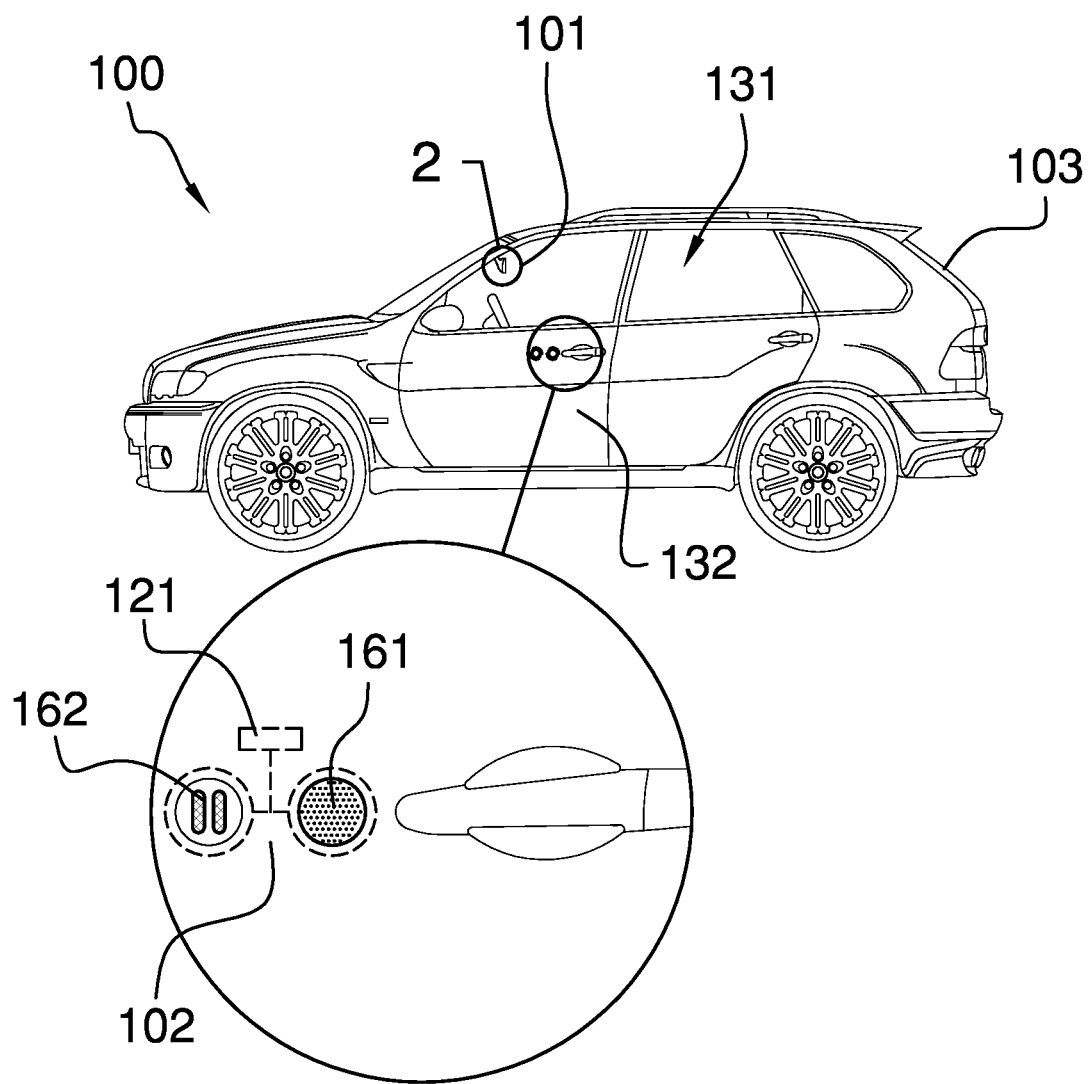
FIG. 1 is a side view of an embodiment of the disclosure.
Figure 2:
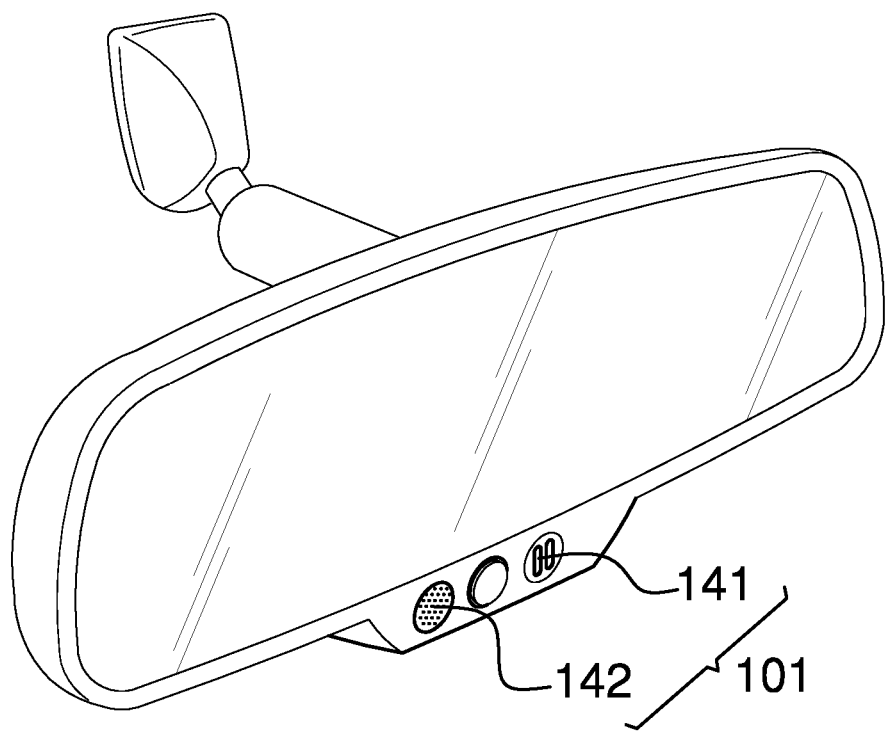
FIG. 2 is a perspective view of an embodiment of the disclosure.
Figure 3:
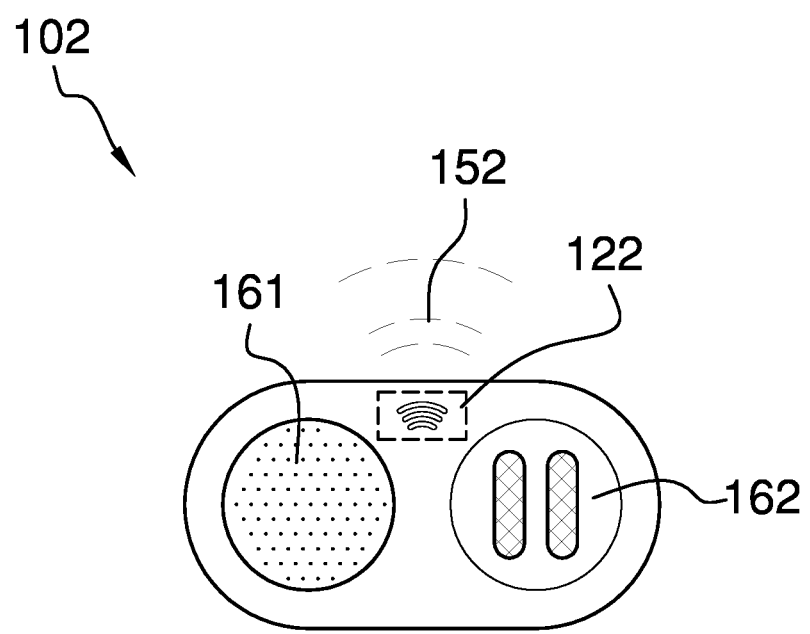
FIG. 3 is a front view of an alternate embodiment of the disclosure.
Figure 4:
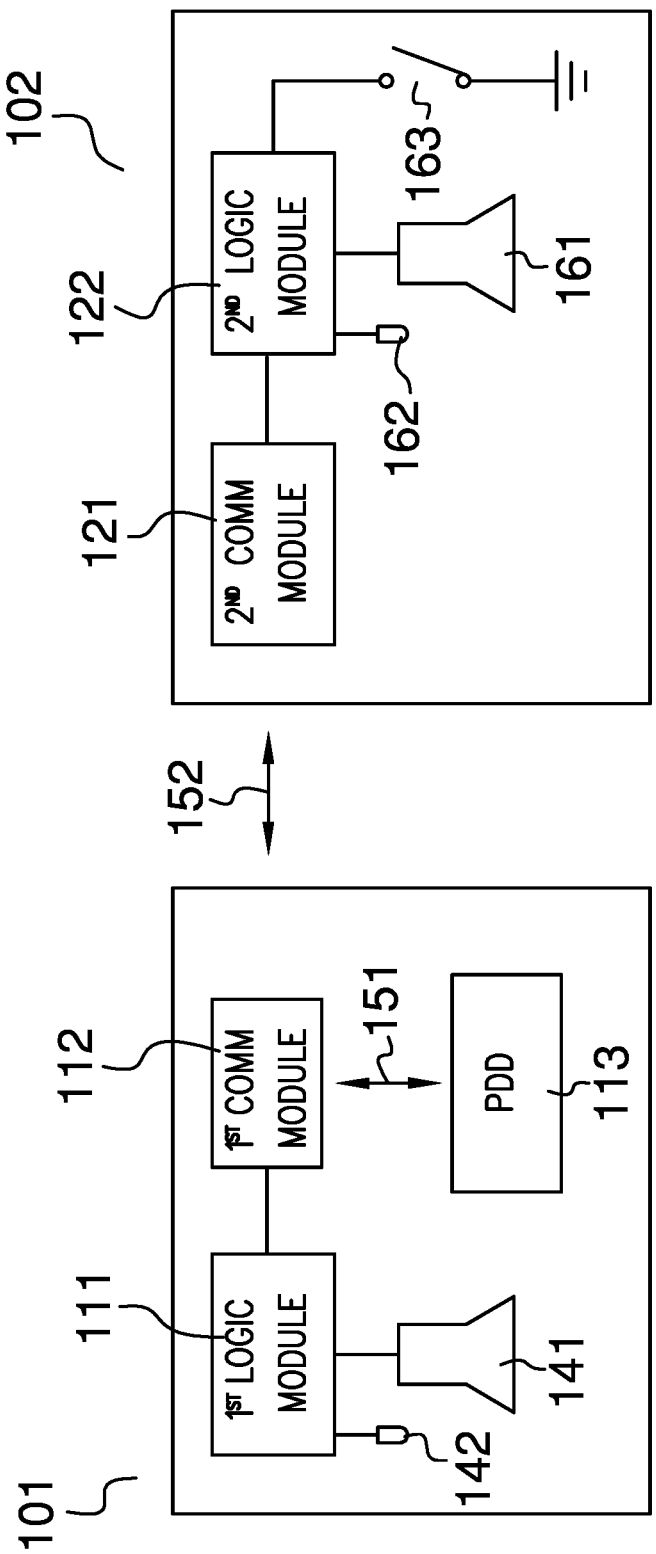
FIG. 4 is a block diagram of an embodiment of the disclosure.

Detailed reference will now be made to one or more potential embodiments of the disclosure, which are illustrated in FIGS. 1 through 4.

The vehicular communication system 100 (hereinafter invention) is a communication device. The invention 100 comprises a primary control circuit 101, an external control circuit 102, and a vehicle 103. The vehicle 103 further comprises a cab 131 and an exterior surface 132. The primary control circuit 101 mounts within the cab 131 of the vehicle 103. The external control circuit 102 mounts on the exterior surface 132 of the vehicle 103. The primary control circuit 101 forms a first wireless communication link 151 with a personal data device 113. The primary control circuit 101 enables hands free operation of the personal data device 113 within the cab 131 of the vehicle 103. The primary control circuit 101 forms a second wireless communication link 152 with the external control circuit 102. The external control circuit 102 enables hands free operation of the personal data device 113 from the exterior of the vehicle 103.

The vehicle 103 is a motorized vehicle 103. The vehicle 103 is configured to transport cargo and passengers over a road network. The vehicle 103 is defined elsewhere in this disclosure. The cab 131 of the vehicle 103 is defined elsewhere in this disclosure. The exterior surface 132 of the vehicle 103 refers to the surfaces of the vehicle 103 that are visible and accessible from the exterior of the vehicle 103.

The primary control circuit 101 is an electric circuit. The primary control circuit 101 mounts in the cab 131 of the vehicle 103. The primary control circuit 101 forms the first wireless communication link 151 with the personal data device 113.

The primary control circuit 101 receives a first set of electrical signals transmitted by the personal data device 113 over the first wireless communication link 151. The primary control circuit 101 converts the received first set of electric signals into audible sounds that are announced within the cab 131 of the vehicle 103. The primary control circuit 101 captures sounds that are audible within the cab 131 of the vehicle 103. The primary control circuit 101 converts the captured sounds into a second set of electric signals. The primary control circuit 101 transmits the second set of electric signals to the personal data device 113 using the first wireless communication link 151

The primary control circuit 101 forms the second wireless communication link 152 with the external control circuit 102. The primary control circuit 101 transmits the second set of electric signals to the external control circuit 102 using the second wireless communication link 152. The primary control circuit 101 retransmits the first set of electric signals received from the personal data device 113 to the external control circuit 102 over the second wireless communication link 152. The primary control circuit 101 receives a third set of electrical signals transmitted by the external control circuit 102. The primary control circuit 101 converts the received third set of electric signals into audible sounds that are announced within the cab 131 of the vehicle 103. The primary control circuit 101 retransmits the third set of electric signals received from the external control circuit 102 to the personal data device 113 over the first wireless communication link 151.

The primary control circuit 101 comprises a first logic module 111, a first communication module 112, and a personal data device 113. The first logic module 111 and the first communication module 112 are electrically interconnected. The first communication module 112 forms a communication link with the personal data device 113. The first logic module 111 comprises a first speaker 141 and a first microphone 142. The first speaker 141 electrically connects to the first logic module 111. The first microphone 142 electrically connects to the first logic module 111. The first communication module 112 further comprises the first wireless communication link 151 and the second wireless communication link 152. The first wireless communication link 151 forms a wireless communication link between the first communication module 112 and the personal data device 113. The second wireless communication link 152 forms a wireless communication link between the first communication module 112 and the external control circuit 102.

The first logic module 111 is a readily and commercially available programmable electronic device that is used to manage, regulate, and operate the primary control circuit 101.

The first communication module 112 is a wireless electronic communication device that allows the first logic module 111 to wirelessly communicate with a locally presented device personal data device 113. The first communication module 112 establishes a first wireless communication link 151 between the primary control circuit 101 and the personal data device 113 or. In the first potential embodiment of the disclosure the first communication module 112 supports a communication protocol selected from the group consisting of a WiFi™ protocol or a Bluetooth™ protocol. The first logic module 111 and the personal data device 113 exchange audio based information over the first wireless communication link 151.

The first communication module 112 is a wireless electronic communication device that allows the first logic module 111 to wirelessly communicate the external control circuit 102. The first communication module 112 establishes a second wireless communication link 152 between the primary control circuit 101 and the external control circuit 102. In the first potential embodiment of the disclosure the first communication module 112 supports a communication protocol selected from the group consisting of a WiFi™ protocol or a Bluetooth™ protocol. The first logic module 111 and the external control circuit 102 exchange audio based information over the second wireless communication link 152.

The personal data device 113 is a programmable electrical device. The personal data device 113 further comprises an application. The personal data device 113 provides data management and communication services through one or more functions referred to as an application. The application is a set of logical operating instructions that are performed by the personal data device 113. The addition of an application will provide increased functionality for the personal data device 113.

The first speaker 141 is a transducer. The first speaker 141 converts an electric signal into an audible sound. The first microphone 142 is a transducer. The first microphone 142 converts audible sounds into an electric signal.

The first logic module 111 controls the operation of the first speaker 141. The first logic module 111 transmits the first set of electric signals to the first speaker 141. The first speaker 141 announces the first set of electric signals that are received from the first logic module 111. The first logic module 111 transmits the third set of electric signals to the first speaker 141. The first speaker 141 announces the third set of electric signals that are received from the first logic module 111. The first logic module 111 retransmits the third set of electric signals to the personal data device 113.

The first logic module 111 controls the operation of the first microphone 142. The first logic module 111 receives the second set of electrical signals transmitted by the first microphone 142. The first logic module 111 retransmits the second set of electric signals received from the first microphone 142 to the personal data device 113 through the first communication module 112 over the first wireless communication link 151. The first logic module 111 retransmits the second set of electric signals received from the first microphone 142 to the external control circuit 102 through the first communication module 112 over the second wireless communication link 152.

The external control circuit 102 is an electric circuit. The external control circuit 102 mounts on the exterior surface 132 of the vehicle 103. The external control circuit 102 forms the second wireless communication link 152 with the first communication module 112 of the primary control circuit 101.

The external control circuit 102 receives the first set of electrical signals transmitted by the primary control circuit 101 over the second wireless communication link 152. The external control circuit 102 converts the received first set of electric signals into audible sounds that are announced from the exterior surface 132 of the vehicle 103.

The external control circuit 102 receives the second set of electrical signals transmitted by the primary control circuit 101 over the second wireless communication link 152. The external control circuit 102 converts the received second set of electric signals into audible sounds that are announced from the exterior surface 132 of the vehicle 103.

The external control circuit 102 captures sounds that are audible from the exterior surface 132 of the vehicle 103. The external control circuit 102 converts the captured sounds into the third set of electric signals. The external control circuit 102 transmits the third set of electric signals to the primary control circuit 101 using the second wireless communication link 152.

The external control circuit 102 comprises a second logic module 121 and a second communication module 122. The second logic module 121 and the second communication module 122 are electrically interconnected. The second communication module 122 establishes the second wireless communication link 152 with the first communication module 112 of the primary control circuit 101.

The second logic module 121 comprises a second speaker 161, a second microphone 162, and an enabling switch 163. The second speaker 161 electrically connects to the second logic module 121. The second microphone 162 electrically connects to the second logic module 121. The enabling switch 163 electrically connects to the second logic module 121.

The second logic module 121 is a readily and commercially available programmable electronic device that is used to manage, regulate, and operate the primary control circuit 101. The second communication module 122 is a wireless electronic communication device that allows the second logic module 121 to wirelessly communicate the primary control circuit 101. The second communication module 122 establishes a second wireless communication link 152 between the primary control circuit 101 and the external control circuit 102. In the first potential embodiment of the disclosure the second communication module 122 supports a communication protocol selected from the group consisting of a WiFi™ protocol or a Bluetooth™ protocol. The second logic module 121 and the external control circuit 102 exchange audio based information over the second wireless communication link 152.

The second speaker 161 is a transducer. The second speaker 161 converts an electric signal into an audible sound. The second microphone 162 is a transducer. The second microphone 162 converts audible sounds into an electric signal. The enabling switch 163 is a maintained switch. The second logic module 121 monitors the status of the enabling switch 163 to determine when the external control circuit 102 should be enabled and disabled.

The second logic module 121 transmits the first set of electric signals received from the primary control circuit 101 to the second speaker 161 for announcement. The second logic module 121 transmits the second set of electric signals received from the primary control circuit 101 to the second speaker 161 for announcement. The second logic module 121 controls the operation of the second microphone 162. The second logic module 121 receives the third set of electric signals from the second microphone 162. The second logic module 121 retransmits the second set of electric signals received from the second microphone 162 to the primary control circuit 101 through the second communication module 122 over the second wireless communication link 152.

The second logic module 121 monitors the status of the enabling switch 163. The second logic module 121 disables the operation of the external control circuit 102 when the second microphone 162 is actuated to a position selected from the group consisting of an open position and a closed position. The second logic module 121 enables the operation of the external control circuit 102 when the second microphone 162 is actuated into the opposite position.

The following definitions were used in this disclosure:

Announce: As used in this disclosure, to announce means to generate audible sounds over a transducer.

Application or App: As used in this disclosure, an application or app is a self-contained piece of software that is especially designed or downloaded for use with a personal data device.

Bluetooth™: As used in this disclosure, Bluetooth™ is a standardized communication protocol that is used to wirelessly interconnect electronic devices.

Communication Link: As used in this disclosure, a communication link refers to the structured exchange of data between two objects.

Exterior: As used in this disclosure, the exterior is used as a relational term that implies that an object is not contained within the boundary of a structure or a space.

GPS: As used in this disclosure, and depending on the context, GPS refers to: a) a system of navigational satellites that are used to determine the position, known as GPS coordinates, and velocity of a person or object; b) the system of navigational satellites referred to in the first definition that are used to synchronize to global time; or, c) an electronic device or that uses the system of navigational satellites referred to in the first definition to determine the position of a person or object. GPS is an acronym for Global Positioning System. Methods to determine the distance and direction between any two sets of GPS coordinates are well-known and documented in the navigational arts.

Hands-Free: As used in this disclosure, hands-free refers to a design characteristic of a device that allows the device to be used or operated without the use of the hands.

Interior: As used in this disclosure, the interior is used as a relational term that implies that an object is contained within the boundary of a structure or a space.

Logic Module: As used in this disclosure, a logic module is a readily and commercially available electrical device that accepts digital and analog inputs, processes the digital and analog inputs according to previously specified logical processes and provides the results of these previously specified logical processes as digital or analog outputs. The disclosure allows, but does not assume, that the logic module is programmable.

Maintained Switch: A used in this disclosure, a maintained switch is a switch that maintains the position that was set in the most recent switch actuation. A maintained switch works in an opposite manner to a momentary switch.

Microphone: As used in this disclosure, a microphone is a transducer that converts the energy from vibration into electrical energy. The sources of vibrations include, but are not limited to, acoustic energy.

PDD: As used in this disclosure, PDD is an acronym for personal data device.

Personal data device: As used in this disclosure, a personal data device is a handheld logical device that is used for managing personal information and communication. Examples of personal data device include, but are not limited to, cellular phones, tablets, and smartphones.

Speaker: As used in this disclosure, a speaker is an electrical transducer that converts an electrical signal into an audible sound.

Switch: As used in this disclosure, a switch is an electrical device that starts and stops the flow of electricity through an electric circuit by completing or interrupting an electric circuit. The act of completing or breaking the electrical circuit is called actuation. Completing or interrupting an electric circuit with a switch is often referred to as closing or opening a switch respectively. Completing or interrupting an electric circuit is also often referred to as making or breaking the circuit respectively.

Transducer: As used in this disclosure, a transducer is a device that converts a physical quantity, such as pressure or brightness into an electrical signal or a device that converts an electrical signal into a physical quantity.

Vehicle: As used in this disclosure, a vehicle is a device that is used for transporting passengers, goods, or equipment. The term motorized vehicle specifically refers to a vehicle can move under power provided by an electric motor or an internal combustion engine. The term vehicle generically applies to motorized vehicles and vehicles without a motor. A motorized vehicle further comprises an electrical system that can be used as a source of electric energy. The enclosed passenger space of a vehicle is known as a cab.

WiFi™: As used in this disclosure, WiFi™ refers to the physical implementation of a collection of wireless electronic communication standards commonly referred to as IEEE 802.11x.

Wireless: As used in this disclosure, wireless is an adjective that is used to describe a communication link between two devices that does not require the use of physical cabling.

Wireless Communication Establishment Technology: As used in this disclosure, a wireless communication establishment technology refers to technology that establishes a wireless communication link between a first logical device and a second logical device. Usually, the operation of a wireless communication establishment technology is initiated by the push of a button. An example of such a technology is the WiFi™ protected setup technology (WPS™).

With respect to the above description, it is to be realized that the optimum dimensional relationship for the various components of the invention described above and in FIGS. 1 through 4 include variations in size, materials, shape, form, function, and manner of operation, assembly and use, are deemed readily apparent and obvious to one skilled in the art, and all equivalent relationships to those illustrated in the drawings and described in the specification are intended to be encompassed by the invention.

It shall be noted that those skilled in the art will readily recognize numerous adaptations and modifications which can be made to the various embodiments of the present invention which will result in an improved invention, yet all of which will fall within the spirit and scope of the present invention as defined in the following claims. Accordingly, the invention is to be limited only by the scope of the following claims and their equivalents.

The inventor claims:

1. A vehicular communication system comprising
a primary control circuit, an external control circuit, and a vehicle;
wherein the vehicle further comprises a cab and an exterior surface;
wherein the primary control circuit mounts within the cab of the vehicle;
wherein the external control circuit mounts on the exterior surface of the vehicle;
wherein the primary control circuit receives a first set of electrical signals transmitted by the personal data device over the first wireless communication link;
wherein the primary control circuit converts the received first set of electric signals into audible sounds that are announced within the cab of the vehicle;
wherein the primary control circuit captures sounds that are audible within the cab of the vehicle;
wherein the primary control circuit converts the captured sounds into a second set of electric signals;
wherein the primary control circuit transmits the second set of electric signals to the personal data device using the first wireless communication link;
wherein the primary control circuit transmits the second set of electric signals to the external control circuit using the second wireless communication link.

2. The vehicular communication system according to claim 1
wherein the vehicular communication system is a communication device;
wherein the primary control circuit forms a first wireless communication link with a personal data device;
wherein the primary control circuit forms a second wireless communication link with the external control circuit.

3. The vehicular communication system according to claim 2 wherein the personal data device is a programmable electrical device.

4. The vehicular communication system according to claim 3
wherein the primary control circuit is an electric circuit;
wherein the primary control circuit mounts in the cab of the vehicle;
wherein the primary control circuit forms the first wireless communication link with the personal data device.

5. The vehicular communication system according to claim 4
wherein the primary control circuit retransmits the first set of electric signals received from the personal data device to the external control circuit over the second wireless communication link.

6. The vehicular communication system according to claim 5
wherein the primary control circuit receives a third set of electrical signals transmitted by the external control circuit;
wherein the primary control circuit converts the received third set of electric signals into audible sounds that are announced within the cab of the vehicle;
wherein the primary control circuit retransmits the third set of electric signals received from the external control circuit to the personal data device over the first wireless communication link.

7. The vehicular communication system according to claim 6
wherein the external control circuit is an electric circuit;
wherein the external control circuit mounts on the exterior surface of the vehicle;
wherein the external control circuit forms the second wireless communication link with the first communication module of the primary control circuit;
wherein the external control circuit receives the first set of electrical signals transmitted by the primary control circuit over the second wireless communication link;
wherein the external control circuit converts the received first set of electric signals into audible sounds that are announced from the exterior surface of the vehicle;
wherein the external control circuit receives the second set of electrical signals transmitted by the primary control circuit over the second wireless communication link;
wherein the external control circuit converts the received second set of electric signals into audible sounds that are announced from the exterior surface of the vehicle;
wherein the external control circuit captures sounds that are audible from the exterior surface of the vehicle;

wherein the external control circuit converts the captured sounds into the third set of electric signals;

wherein the external control circuit transmits the third set of electric signals to the primary control circuit using the second wireless communication link.

8. The vehicular communication system according to claim 7
wherein the primary control circuit comprises a first logic module, a first communication module, and a personal data device;
wherein the first logic module and the first communication module are electrically interconnected;
wherein the first logic module comprises a first speaker and a first microphone;
wherein the first speaker electrically connects to the first logic module;
wherein the first microphone electrically connects to the first logic module;
wherein the first communication module further comprises the first wireless communication link and the second wireless communication link.

9. The vehicular communication system according to claim 8
wherein the external control circuit comprises a second logic module and a second communication module;
wherein the second logic module and the second communication module are electrically interconnected;
wherein the second communication module establishes the second wireless communication link with the first communication module of the primary control circuit;
wherein the second logic module comprises a second speaker, a second microphone, and an enabling switch;
wherein the second speaker electrically connects to the second logic module;
wherein the second microphone electrically connects to the second logic module;
wherein the enabling switch electrically connects to the second logic module.

10. The vehicular communication system according to claim 9
wherein the first logic module is a programmable electronic device;
wherein the first communication module is a wireless electronic communication device;
wherein the first communication module establishes the first wireless communication link between the primary control circuit and the personal data device or;
wherein the first logic module and the personal data device exchange audio based information over the first wireless communication link;
wherein the first communication module establishes the second wireless communication link between the primary control circuit and the external control circuit;
wherein the first logic module and the external control circuit exchange audio based information over the second wireless communication link.

11. The vehicular communication system according to claim 10
wherein the first speaker is a transducer;
wherein the first speaker converts an electric signal into an audible sound;
wherein the first microphone is a transducer;
wherein the first microphone converts audible sounds into an electric signal;
wherein the first logic module controls the operation of the first speaker;
wherein the first logic module transmits the first set of electric signals to the first speaker;
wherein the first speaker announces the first set of electric signals that are received from the first logic module;
wherein the first logic module transmits the third set of electric signals to the first speaker;
wherein the first speaker announces the third set of electric signals that are received from the first logic module;
wherein the first logic module retransmits the third set of electric signals to the personal data device;
wherein the first logic module controls the operation of the first microphone;
wherein the first logic module receives the second set of electrical signals transmitted by the first microphone;
wherein the first logic module retransmits the second set of electric signals received from the first microphone to the personal data device through the first communication module over the first wireless communication link;
wherein the first logic module retransmits the second set of electric signals received from the first microphone to the external control circuit through the first communication module over the second wireless communication link.

12. The vehicular communication system according to claim 11
wherein the second logic module is a programmable electronic device;
wherein the second communication module is a wireless electronic communication device;
wherein the second logic module and the external control circuit exchange audio based information over the second wireless communication link.

13. The vehicular communication system according to claim 12
wherein the second speaker is a transducer;
wherein the second speaker converts an electric signal into an audible sound;
wherein the second microphone is a transducer;
wherein the second microphone converts audible sounds into an electric signal;
wherein the enabling switch is a maintained switch;
wherein the second logic module monitors the status of the enabling switch to determine when the external control circuit should be enabled and disabled;
wherein the second logic module transmits the first set of electric signals received from the primary control circuit to the second speaker for announcement;
wherein the second logic module transmits the second set of electric signals received from the primary control circuit to the second speaker for announcement;
wherein the second logic module controls the operation of the second microphone;
wherein the second logic module receives the third set of electric signals from the second microphone;
wherein the second logic module retransmits the second set of electric signals received from the second microphone to the primary control circuit through the second communication module over the second wireless communication link;
wherein the second logic module monitors the status of the enabling switch;
wherein the second logic module disables the operation of the external control circuit when the second microphone is actuated to a position selected from the group consisting of an open position and a closed position;

wherein the second logic module enables the operation of the external control circuit when the second microphone is actuated into the opposite position.

\* \* \* \* \*